United States Patent
Hoffjann et al.

(10) Patent No.: US 7,431,238 B2
(45) Date of Patent: Oct. 7, 2008

(54) ARRANGEMENT AND METHOD FOR THE GENERATION OF WATER ON BOARD AN AIRCRAFT

(75) Inventors: Claus Hoffjann, Wulmstorf (DE);
Hansgeorg Schuldzig, Jork (DE);
Hans-Juergen Heinrich, Hamburg (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/458,490

(22) Filed: Jul. 19, 2006

(65) Prior Publication Data
US 2006/0251933 A1  Nov. 9, 2006

Related U.S. Application Data

(62) Division of application No. 10/999,052, filed on Nov. 29, 2004, now Pat. No. 7,108,229.

(30) Foreign Application Priority Data
Nov. 27, 2003  (DE) ................. 103 56 012

(51) Int. Cl.
*B64D 41/00* (2006.01)
(52) U.S. Cl. .............. 244/58; 244/118.5; 429/13
(58) Field of Classification Search .............. 429/12, 429/13, 19, 20; 244/172.2, 172.3, 59, 58, 244/61, 128
See application file for complete search history.

(56) References Cited

U.S. PATENT DOCUMENTS

| 3,634,140 | A | * | 1/1972 | Von Krusenstiema | 429/25 |
| 5,069,985 | A | * | 12/1991 | Cohen et al. | 429/26 |
| 6,127,058 | A | * | 10/2000 | Pratt et al. | 429/30 |

(Continued)

FOREIGN PATENT DOCUMENTS

DE  198 21 952  11/1999

(Continued)

OTHER PUBLICATIONS

"Fuel Cell Basics", page from website www.americanhistory.si.edu/fuelcells/basics.htm, dated 2001.*

*Primary Examiner*—Rob Swiatek
*Assistant Examiner*—Benjamin P Lee
(74) *Attorney, Agent, or Firm*—Ostrolenk, Faber, Gerb & Soffen, LLP

(57) ABSTRACT

An arrangement and a method are proposed for the generation of water on board an aircraft with the use of one or more fuel cells, whereby low-temperature fuel cells are provided as fuel cells.

Figure 1:
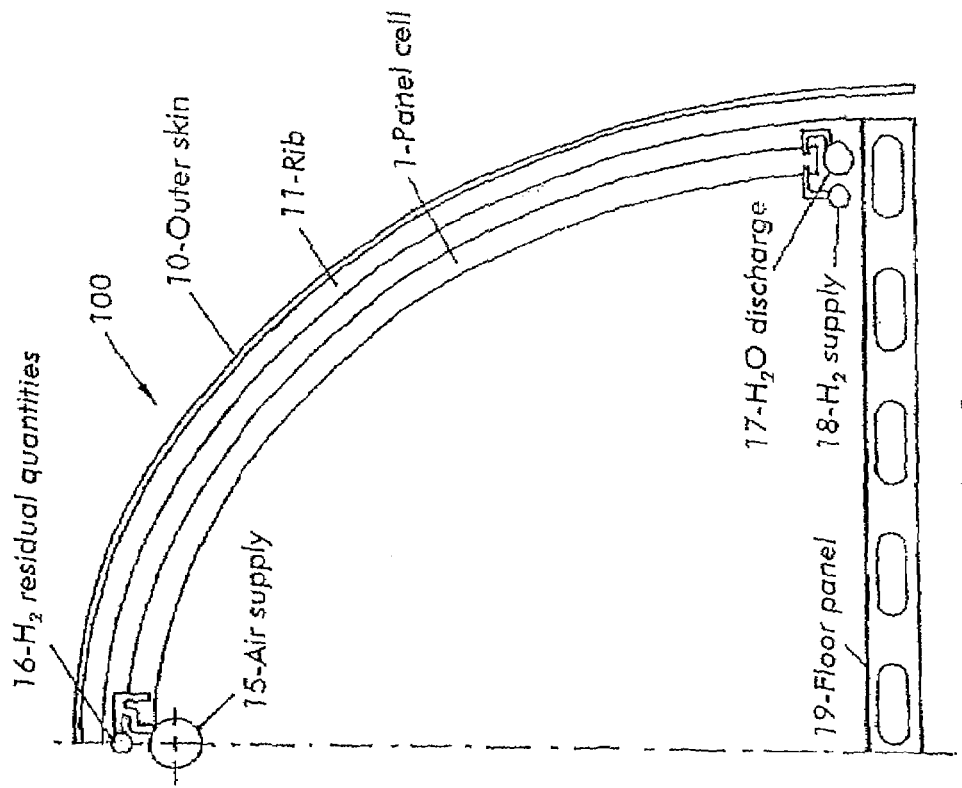

It is proposed that several single-cell or few-cell fuel cells may form a fuel-cell panel or cell array and several cell panels or cell arrays may be arranged close to the inside of the aircraft fuselage and the cathode side of the at least one fuel cell has a chamber pointing to the exterior of the aircraft for the condensation of the water contained in the air and the anode side has a chamber carrying a combustion gas, for example hydrogen.

With the proposed solution, a reduction in the storage capacity for drinking water and its quality-assured provision may be enabled and moreover, with the use of fuel cells as a virtual power station, the energy demand on engine generators, auxiliary power unit (APU) or ram air turbine (RAT) may be reduced.

7 Claims, 3 Drawing Sheets

U.S. PATENT DOCUMENTS

| | | | |
|---|---|---|---|
| 6,296,957 B1* | 10/2001 | Graage | 429/12 |
| 6,312,842 B1* | 11/2001 | Reiser et al. | 429/13 |
| 6,406,808 B1* | 6/2002 | Pratt et al. | 429/26 |
| 6,410,180 B1* | 6/2002 | Cisar et al. | 429/41 |
| 6,743,536 B2* | 6/2004 | Fuglevand | 429/9 |
| 6,821,663 B2* | 11/2004 | McElroy et al. | 429/17 |
| 6,834,831 B2* | 12/2004 | Daggett | 244/58 |
| 6,841,290 B2* | 1/2005 | Klitsner et al. | 429/44 |
| 7,037,616 B2* | 5/2006 | Nomura et al. | 429/34 |
| 7,108,229 B2* | 9/2006 | Hoffjann et al. | 244/172.2 |
| 7,169,489 B2* | 1/2007 | Redmond | 429/12 |
| 7,175,933 B2* | 2/2007 | Nakanishi et al. | 429/34 |
| 7,208,239 B2* | 4/2007 | Hoffjann et al. | 429/17 |
| 7,210,653 B2* | 5/2007 | Atkey et al. | 244/58 |
| 7,235,322 B2* | 6/2007 | Akikusa et al. | 429/32 |
| 7,249,732 B2* | 7/2007 | Sanders et al. | 244/23 A |
| 2002/0098393 A1* | 7/2002 | Dine et al. | 429/13 |
| 2002/0150804 A1* | 10/2002 | Srinivasan et al. | 429/32 |
| 2002/0185115 A1* | 12/2002 | Capshaw et al. | 123/518 |
| 2003/0082431 A1* | 5/2003 | Klitsner et al. | 429/38 |
| 2003/0118881 A1* | 6/2003 | Walsh et al. | 429/25 |
| 2004/0038089 A1 | 2/2004 | Hoffjann et al. | 429/12 |
| 2004/0043276 A1* | 3/2004 | Hoffjann et al. | 429/34 |
| 2004/0224193 A1* | 11/2004 | Mitlitsky et al. | 429/13 |
| 2004/0247966 A1* | 12/2004 | Stute | 429/26 |
| 2005/0037250 A1* | 2/2005 | Gunther | 429/26 |
| 2005/0130007 A1* | 6/2005 | Cisar et al. | 429/32 |
| 2005/0244684 A1* | 11/2005 | Koripella | 429/20 |
| 2005/0250004 A1* | 11/2005 | McLean et al. | 429/122 |
| 2006/0011525 A1* | 1/2006 | Hoffjann et al. | 210/136 |
| 2006/0057443 A1* | 3/2006 | Cooper | 429/19 |
| 2006/0127714 A1* | 6/2006 | Vik et al. | 429/19 |
| 2006/0127734 A1* | 6/2006 | McLean et al. | 429/34 |
| 2006/0251949 A1* | 11/2006 | Nakanishi et al. | 429/38 |
| 2007/0034738 A1* | 2/2007 | Sanders et al. | 244/23 A |
| 2007/0090786 A1* | 4/2007 | McLean | 320/101 |

FOREIGN PATENT DOCUMENTS

| | | |
|---|---|---|
| DE | 100 28 450 | 4/2002 |
| DE | 101 42 125 | 3/2003 |
| EP | 1 357 625 | 10/2003 |

\* cited by examiner

US 7,431,238 B2

ARRANGEMENT AND METHOD FOR THE GENERATION OF WATER ON BOARD AN AIRCRAFT

CROSS REFERENCE TO RELATED APPLICATIONS

This is a divisional of U.S. patent application Ser. No. 10/999,052, filed Nov. 29, 2004 now U.S. Pat. No. 7,108,229 in the name of Claus Hoffjann et al. and entitled ARRANGEMENT AND METHOD FOR THE GENERATION OF WATER ON BOARD AN AIRCRAFT, which claims priority of German Application No. 103 56 012.2-45, filed Nov. 27, 2003.

FIELD OF THE INVENTION

The invention relates to an arrangement and a method for the generation of water on board an aircraft with the use of one or more fuel cells, whereby low-temperature fuel cells are provided as fuel cells.

TECHNOLOGICAL BACKGROUND

A power supply unit on board an aircraft as a substitute for a main engine, an auxiliary power unit, a ram air turbine or an NiCd battery is known from EP 957 026 A2. A fuel cell serves here to generate direct current, whereby used air from the aircraft air-conditioning unit or aircraft external air is used for the air supply to the fuel cells. Water for the water supply on the aircraft is obtained from the fuel cell exit air, whereby the fuel cell exit air is then carried away to the aircraft surroundings, which also applies to the hydrogen emerging from the fuel cell. Generation of water by means of a water condenser arranged in the exit air flow can take place as an advantageous secondary effect. The arrangement of the fuel cell module is provided in the aircraft tail.

SUMMARY OF THE INVENTION

There may be a desire to provide an arrangement and a method, wherein at least one fuel cell is provided for water generation and for current generation, which is integrated in a favourable manner into the passenger cabin area of an aircraft in a space-saving way.

In an arrangement according to an exemplary embodiment of the invention, several single-cell or few-cell fuel cells form a fuel-cell panel or cell array and several cell panels or cell arrays are arranged close to the inside of the fuselage skin and the cathode side of the at least one fuel cell has a chamber pointing towards the exterior of the aircraft for the condensation of the water contained in the air and the anode side has a chamber carrying a combustion gas, for example hydrogen.

There may be an advantage that, with the proposed solution, a reduction of storage capacity for drinking water and its quality-assured provision is enabled and moreover, with the use of the fuel cells as a virtual power station, the energy requirement on engine generators, auxiliary power unit (APU) or ram air turbine (RAT) can be reduced or completely saved. The generation of water may be of particular importance for application in aviation and space travel, because here autonomous systems are required for the onboard supply in order to avoid large storage volumes and weights for the required drinking water. A modular concept consisting of numerous identical components stands to the fore, which, with a high degree of redundancy, solves the aspects of power and water supply on board aircraft by means of a fuel and air supply, likewise having a modular construction, as well as water condensation and distribution.

Examples of embodiment of the invention are shown in the drawing, which are described in greater detail below with the aid of FIGS. 1 to 4. Identical components are designated by identical reference numbers in the figures.

Figure 2:
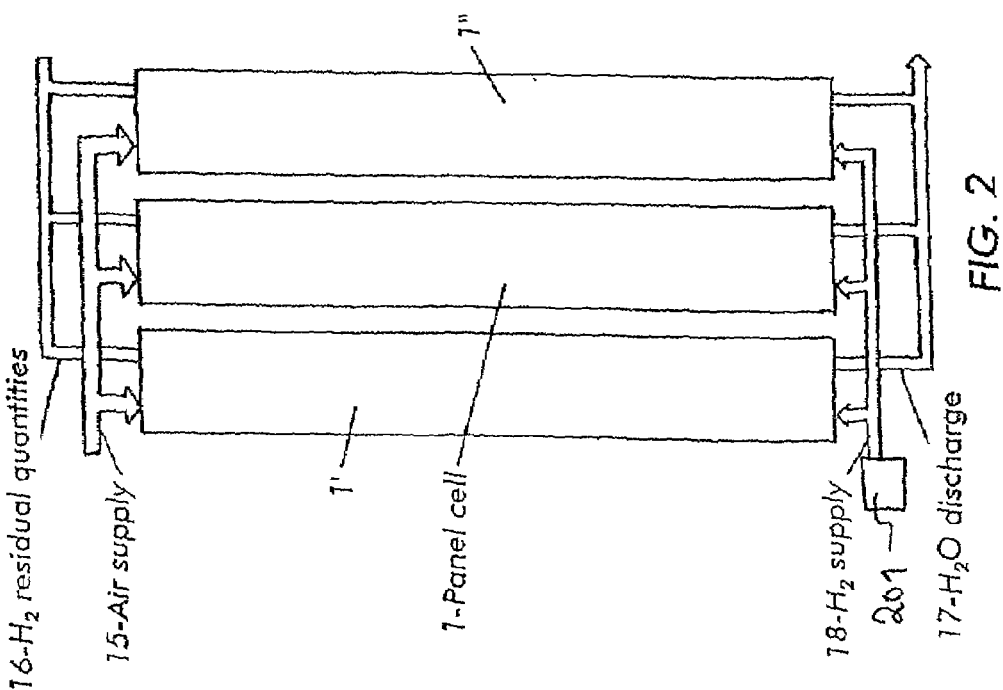
Figure 3:
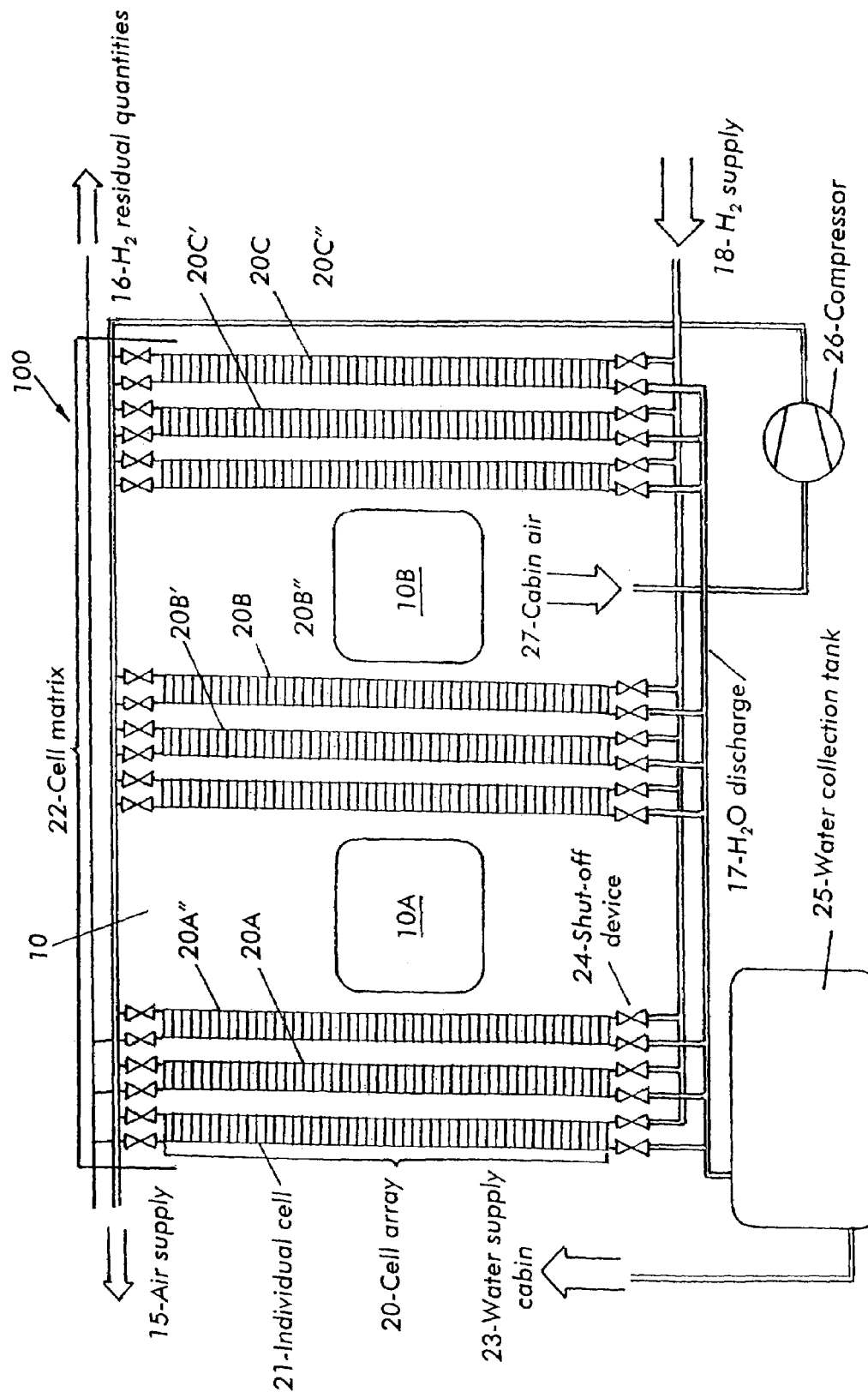
Figure 4:
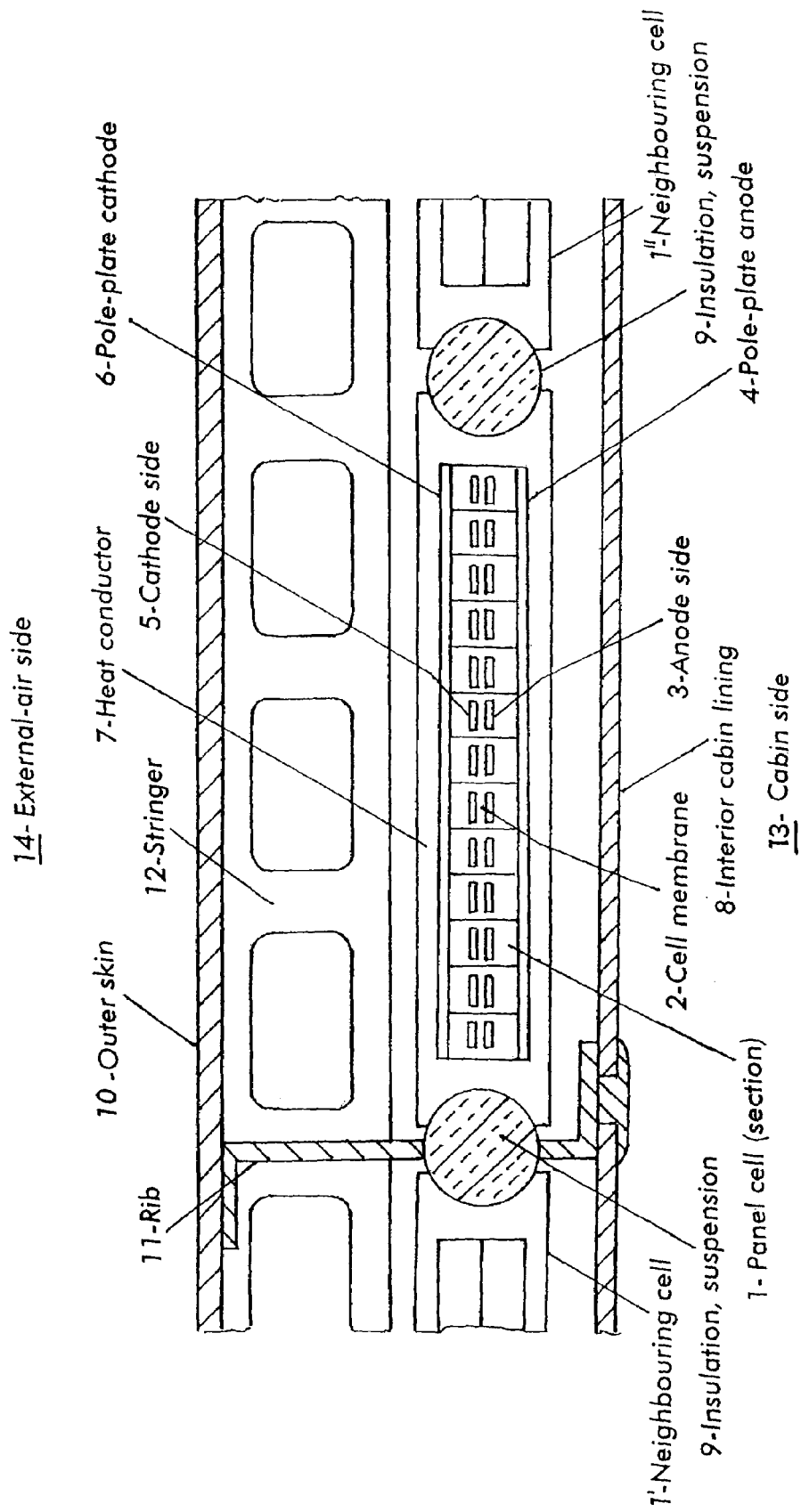

In detail, the figures show the following:

FIG. 1 a partial cross-section of an aircraft with a diagrammatically represented arrangement of a fuel-cell panel according to the invention, FIG. 2 a diagrammatic representation of an arrangement of fuel-cell panels in a view from in front, FIG. 3 a form of embodiment, according to the invention, of an arrangement for the generation of water in the area of the passenger cabin and FIG. 4 a sectional representation of a fuel-cell panel in the state installed in a passenger cabin of an aircraft.

DESCRIPTION OF EXEMPLARY EMBODIMENTS

Fuel cells can also be used for water generation, apart from current generation. The arrangement described below serves to reduce storage capacity for drinking water and its quality-assured provision and also as a virtual power station, which reduces or completely saves the energy demand on engine generators, auxiliary power unit (APU) or ram air turbine (RAT).

FIG. 1 shows a partial cross-section of an aircraft 100 with a diagrammatically represented arrangement of a fuel-cell panel 1 according to the invention. Panel 1 is provided in the vicinity of fuselage outer skin 10 of aircraft 100.

Panel 1 can be mounted directly on the cabin structure or on aircraft structural parts, such as on rib 11 of an aircraft (see also FIG. 4, suspension 9). Several of these panels form a cell matrix 22 (see for example the form of embodiment in FIG. 3). Panel 1 is flexible and curved in such a way that it conforms to the inside of the cabin or inside of fuselage skin 10, whereby the cathode side points outwards towards the fuselage skin and the anode side towards the interior of the cabin space.

Each panel forms a self-contained and completely encapsulated system which prevents the media being supplied and carried away from being released to the passenger cabin or outside the aircraft. It can be seen in connection with FIG. 2 that the required media are supplied by means of piping systems, such as a combustion gas supply 18, for example a hydrogen/$H_2$ supply, and an atmospheric oxygen supply 15, which is obtained from the cabin air, and consumed media are carried away by means of a condensate discharge 17 and an exit-air and residual-gas discharge 16.

Air supply 15 and exit-air and residual-gas discharge 16 are arranged above panel 1, preferably in the roof area of aircraft 100. Combustion gas supply ($H_2$ supply) 18 and discharge 17 of the generated water are routed via piping systems from below to panel 1 and are preferably provided close to aircraft floor 19 in the area of outer skin 10.

It can be seen from FIGS. 2 and 3 that, in the present form of embodiment, fuel-cell panels 1, 1', 1" may be distributed uniformly on the inside of outer skin 10 for the purpose of optimising the weight distribution.

It is shown in FIG. 3 that a large number of fuel cells (individual cell 21 or multiple-cell elements) can be assembled into cell arrays 20A, 20A', 20A" . . . along outer skin 10 of aircraft 100. These cell arrays 20A, 20A', 20A", 20B, 20B', 20B", 20C, 20C', 20C" . . . form a cell matrix 22, which can be arranged for example along the whole cabin area on fuselage outer skin 10, whereby only an area between cutouts 10A and 10B for cabin windows is shown here. If the fuselage cell of aircraft 100 is deformed elastically by flight movements, several strip-shaped independent systems, for example panel 1, 1', 1" or cell arrays 20A, 20A', 20A" are provided. Combinations thereof can however also be connected into a system. By means of an arrangement of several panels 1, 1', 1" and further cell arrays 20B, 20B', 20B", 20C, 20C', 20C", a high degree of redundancy is additionally achieved, i.e. the failure of individual modules does not impair the function of the overall system, but rather has only a slight effect on the maximum achievable power.

The connection elements between panel 1 or cell array 20 to the media-carrying lines can, in the function as a shut-off device 24, be designed as gas-tight rapid-action couplings and serve at the same time as a mechanical bearing element.

In a further embodiment (not shown), the coupling elements of the media-carrying lines, but in particular in combustion-gas line 18, may contain safety valves, which with a sudden pressure drop immediately close the supply and discharge lines for affected panel 1, 1', 1" or cell array 20, 20', 20".

It can further be seen in FIG. 3 that the condensate carried away from panels 1, 1', 1" or cell arrays 20, 20', 20" via water line 17 can be taken up in a water collection tank 25 and used for water supply 23 for the passenger cabin. For the provision of air supply 15 to the fuel cells, cabin air 27 for example is used and conveyed by means of a compressor 26 to air supply 15.

FIG. 4 shows, in a sectional representation, a fuel-cell panel 1 in the installed state in the area of outer skin 10 of the aircraft. The installation of panel 1 takes place close to fuselage skin 10 between stringer 12 and interior cabin lining 8, whereby the width of panel 1 can be adapted to the spacing of ribs 11 of aircraft 100.

Single-cell or few-cell fuel cells are provided for panel 1, cathode side 5 of said cells forming a chamber which points towards cold outer side 14 of aircraft 100 in order to achieve here the condensation of the water contained in the exit air, and anode side 3 of said cells being bounded by a chamber carrying combustion gas (e.g. hydrogen).

Energy-tapping of direct current takes place at pole-plate cathode 6 and at pole-plate anode 4 respectively.

The water obtained through condensation forms drops on the cathode-side colder wall of chamber 5 facing fuselage skin 10, whereby the drops run down thereon following the force of gravity and are collected there in a collection pipe 17 and transported in the direction of a collection container 25. An air stream introduced from above is provided for the cathode-side cell supply with oxygen and also serves for the transport of water.

The cathode space is bounded by a housing, which outer side can be heated. This heating is designed in such a way that a temperature can be selected in order to use the outer wall of cathode space 5 at the same time as a condensation area for the water vapour arising in the fuel cell process.

This water collects at the bottom of cathode space 5 and is drawn off, via line system 17 (see FIG. 3) which connects all panels 1, 1', 1" together, by means of a pressure difference between cathode space 5 and connected line system 17. The supply with air takes place via second piping system 15 (see FIG. 3), which is located above panels 1, 1', 1".

The heating of the cathode-space outer wall takes place via a system of heat carriers or heat conductors 7, which are able to transport the heat arising at anode side 3 onto cathode side 5 lying opposite. This can take place by means of liquid, gaseous or solid media, for example by means of standard conductors, such as copper. The heat loss on anode side 3 lying on the inside, i.e. pointing towards the cabin, is hereby adjusted in such a way that optimum heat conditions are established for passenger comfort. The heat arising on anode side 3 is thus used on the one hand to heat the cathode side in order to prevent freezing of the water arising here and, at the same time, to deliver heat to passenger cabin 13 when required.

The anode space is also arranged in a housing. The combustion gas ($H_2$) is admitted from below into the anode space. Excess quantities are drawn off at the panel upper side and brought back into the $H_2$ storage unit.

For safety reasons, wall 8 on the cabin side is secured by an internal reinforcement against penetration of objects.

The anode-side chamber, i.e. the chamber carrying combustion gas ($H_2$), points towards the inside or cabin side of the aircraft.

The arrangement may allow that, even in the event of damage to outer skin 10 with perforation into the cabin, only small quantities of combustion gas can flow out. The special arrangement and the pressure conditions between cabin 13 and external-air side 14 additionally prevent combustion gas being able to flow into the cabin interior, but rather it always flows in the direction of the external perforation and is thus released into the open atmosphere.

In this event, furthermore, the gas flowing to affected fuel-cell panel 1, 1', 1" is switched off immediately by safety valves, so that only very small gas quantities can escape. The discharging water-collection line of affected panel 1, 1', 1" is also closed, so that the remaining panels present are able to continue generating water and sending it into the water circuit.

In the event of the penetration of an object through outer skin 10 of the aircraft and panel 1, 1', 1", the following situation arises:

During flight, a pressure difference of approx. 0.5 bar (pressure difference=0 on the ground) arises between the external pressure and the cabin pressure. The combustion gas is present in panel 1, 1', 1" with a pressure of approx. 1.2 bar, which means a pressure difference of approx. 0.7 bar to external-air side 14. It follows from this that, in the event of a perforation, the gases present in the panel flow through the perforation opening outwards, i.e. in the direction of external-air side 14.

On the ground, with equalized pressure conditions, this situation will not occur. Here, the curved shape of panel 1, 1', 1" and its position in the upper area of the cabin assists the outflow of the gases to external-air side 14.

In addition, each fuel-cell panel is automatically cut off from the combustion-gas supply by the safety valve when there is a loss of pressure. This guarantees that only the combustion gas present in fuel-cell panel 1, 1', 1" at the time of the perforation can flow out, which however does not form an inflammable mixture inside cabin 13 on account of the quantitative proportions.

A mechanical protection against perforation at the wall of fuel-cell panel 1, 1', 1" pointing towards cabin side 13, for example made of a carbon fibre mesh, largely prevents this situation from arising at all. Such carbon fibre mesh is at the same time suitable for forming the mechanical structure of panel 1, 1', 1" and the reinforcement points for the attachment to the aircraft structure.

The functional sequence for the generation of water is described in the following:

Supply of Fuel and Air

Hydrogen $H_2$ is provided as the fuel. This can be carried on board in gaseous or liquid form or can be reformed in a reformer 201 from a hydrocarbon—in the present case from kerosene. In the case of the reformation of hydrogen from kerosene, attention should be paid to the sulphur fraction contained in the kerosene. If need be, a desulphurisation process is connected upstream of the reformer 201. In addition, a CO shift stage is connected downstream of the reformer, said CO shift stage converting carbon monoxide arising in the reformation, which is harmful to the fuel cell, into carbon dioxide which is harmless to the fuel cell.

As an alternative to a reformer with the shift stage and desulphurisation unit, a high-temperature fuel cell can perform the same function. In the present case, the latter is operated in such a way that it reforms much more hydrogen from kerosene than it itself requires for the generation of electrical energy through an applied electrical load. This excess of hydrogen is separated from the other exit gases by means of a molecular sieve, cooled and fed to the panel fuel cells.

The supplied gases (air and $H_2$) are preheated to the optimum operating temperature of the fuel cells. This can be achieved by means of the heat arising in the reformer process. An electric preheater could also be used.

Condensation

In order to guarantee that the cathode condensate does not freeze at great flight altitudes with external temperatures well below the freezing point of water (for example −55° C.), the cathode-side external chamber wall contains a device for temperature regulation, which enables a uniform temperature distribution on this wall as narrowly above the freezing point of water as possible, in order in this way to obtain the greatest possible quantity of condensate.

The temperature regulation can be carried out for example by coupling temperature sensors to an adjustable heat release—for example through Pelletier elements—on anode side 3 into heat conductor 7. At the same time, a cooling device—for example supplied by the air-conditioning unit or by Pelletier elements—acts on this wall during the ground operation in a warmer environment or in the presence of solar radiation on the outer skin, in order that condensate can be obtained under all operating conditions.

Drawing off of Water and Distribution

Conduit 17 for the collection of the cathode-side condensate ($H_2O$) runs beneath fuel-cell panels 1, 1', 1", each of panels 1, 1', 1" being connected to said conduit. This collection line leads to a water collection container 25.

In order to allow a complete draining of the condensate from fuel-cell panels 1, 1', 1", collection container 25 is pressurised with the cabin pressure in one form of embodiment, whilst the air being supplied to panels 1, 1', 1" has a slight overpressure produced by compressor 26 (see FIG. 3) (for example approx. 0.7 bar cabin pressure to approx. 1.2 bar compressor pressure). The pressure difference thus arising between panel 1 (or cell array 20) and collection container 25 causes the occurring condensate to be drawn off from fuel-cell panel 1 in the direction of collection container 25.

Compressor 26 for the air supply to fuel-cell panels 1 draws off air 27 from the cabin, so that overall the pressure equilibrium in the cabin remains intact.

What is claimed is:

1. A method for generating water on board an aircraft comprising the steps of:
    providing at least one fuel cell having a cathode side with a first chamber arranged towards an outside of the aircraft;
    forming at least one of a fuel-cell panel and a cell array, which includes the at least one fuel cell, such that the at least one of the fuel-cell panel and a cell array is curved and arranged in close proximity to a fuselage skin of the aircraft;
    supplying cold air from an external-air side of the aircraft to the cathode side of the at least one fuel cell;
    in the first chamber, condensing the cold air supplied to the at least one fuel-cell to form water; and
    collecting the water for consumption.

2. The method according to claim 1, wherein the at least one fuel cell has an anode side, wherein a combustion gas is fed to the anode side of the at least one fuel cell, and wherein a waste heat arising in the at least one fuel-cell on the anode side is used partially to supply heat to a temperature control process between chambers of the at least one fuel cell and an outer wall to form a condensate and partially to supply heat into an aircraft cabin.

3. The method according to claim 1, further comprising the steps of: actively heating the cathode side of the at least one fuel cell; and simultaneously cooling an anode side of the at least one fuel cell, wherein the active heating and simultaneous cooling are performed by heating and cooling elements.

4. The method according to claim 1, further comprising the steps of:
    providing a pressure difference between an air supply and a condensate discharge for transporting the condensate from the fuel cell in the direction of a collection container.

5. The method according to claim 1, further comprising providing hydrogen for the operation of the at least one fuel cell, the hydrogen being obtained in a reformer process from a hydrocarbon, and the hydrogen containing fractions of carbon dioxide but no carbon monoxide.

6. The method according to claim 5, wherein the at least one fuel cell is a high temperature fuel cell, the reformer process taking place in the high-temperature fuel cell, and the fuel cell being adjusted in terms of its operating parameters such that it produces free $H_2$ molecules form the hydrocarbon and water and converts released carbon monoxide fractions into carbon dioxide.

7. The method according to claim 1,
    wherein a plurality of fuel cells is provided; and
    wherein a flexible adaption to an instantaneous current consumption is performed by an electrical connection of the plurality of fuel cells.

* * * * *